Patented July 26, 1938

2,125,103

UNITED STATES PATENT OFFICE 2,125,103

METHOD OF MANUFACTURING COLORED SOLUBLE CELLULOSE

Emile de Stubner, New York, N. Y.

No Drawing. Application April 25, 1931, Serial No. 533,003

3 Claims. (Cl. 134—79)

This invention relates to a new method of manufacturing pigmented or colored soluble cellulose. The within disclosures constitute in part a continuation of the subject matter of my copending application for Pigments and process for making same bearing Serial No. 137,382 filed September 23rd, 1926; Pigmented soluble cellulose and process of making same being now United States Patent No. 1,795,764 issued March 10th, 1931, more especially the third division in said case mentioned in the office action of December 13th, 1927, where "the colored matter is in suspenson in a liquid which is mixed with the soluble cellulose" and which division related to the claim in said case reading as follows: "The process of making pigmented or colored cellulose which consists in subjecting soluble cellulose to the action of a fluid containing the coloring matter in suspension."; Lacquer and process for making same, filed October 18th, 1929, bearing Serial No. 400,744 and Colored soluble cellulose and process for making same, filed January 8th, 1930, bearing Serial No. 419,471.

In these said applications and patents I have disclosed methods of manufacturing pigment pulps, pigmented soluble cellulose deriving from precipitated pigments, methods of dehydration, pigmented soluble cellulose deriving from preformed and commercial pigments and methods of manufacturing various end products deriving from the foregoing such as pulps, pastes and bases for end products such as lacquer, celluloid, artificial leather and the like and methods of manufacturing said end products as finished articles of commerce.

In my said co-pending application for Colored soluble cellulose and process for making same bearing Serial No. 419,471, I specifically disclosed the process of creating a non-aqueous pigmented soluble cellulose. In all of my said applications and patent, I have disclosed the treatment of my pigmented soluble cellulose with various solvents for the purposes indicated therein such as making lacquer for example. In all of my developments, inventions and experimental work, I have always utilized the method of introducing a suitable solvent with my pigmented soluble cellulose depending upon the nature of the end product into which it is desired to utilize the pigmented soluble cellulose.

In this case, I wish to disclose that commercial industrial alcohol due to the denaturant it contains will act to a limited extent on its own account as a solvent for soluble cellulose fibres such as the fibres of nitrocellulose. For example, the United States Government Formula No. 1 for denatured alcohol provides for:

100 parts by volume of ethyl alcohol
10 parts by volume of wood alcohol
0.5 part by volume of benzine.

The wood alcohol contains between 10 and 20 grams of acetone for each 100 parts of alcohol together with about 5 grams of methyl-acetate and acetones and methyl-acetates are well known as solvents for fibrous soluble cellulose such as nitrocellulose.

Therefore, while I am treating my pigmented fibrous soluble cellulose in a kneading machine in accordance with the examples given in case No. 419,471 and have dispersed the pigment particles throughout and upon the mass of the fibres of the soluble cellulose, I have by reason of the foregoing characteristics of my industrial alcohol subjected the mass to the action of a relatively small amount of volatile solvent. While I do not wish to be and am not bound by any theory appertaining to the action, interaction or reaction of these components whether it be a change in viscosity, a temperature raise due to the action of such a machine itself, friction of particle against particle or whatever the cause, the result is that the dispersion of my pigment particles throughout the mass is maintained and any agglomeration is avoided, an even distribution of the dispersed particles assured and the whole mass then readily accepts such diluents or solvents as may be desired.

It must be understood of course that I may employ a small amount of suitable solvent for fibrous soluble cellulose either in lieu of or in addition to that present in the industrial alcohol so that such a small amount of solvent would be added to the examples given in the case No. 419,471, such small amount of solvent however being insufficient to reduce the viscosity to a point where the pigmented particles lose their heretofore maintained dispersion.

Having thus described my invention what I claim and desire to secure by United States Letters Patent is:—

1. An improved method for preparing a pigmented lacquer base which consists in the new step of first subjecting without grinding or rolling pressure a non-aqueous mix of nitro-cellulose and unground pigment solely to the kneading action of a mixing machine in the presence of a relatively small quantity of a liquid volatile solvent to initiate the chemical action of dissolving the nitro-cellulose simultaneously with the pulverization of the pigment and its dispersion throughout the batch, the said initial quantity of liquid solvent being insufficient to complete the dissolution of the nitrocellulose but of an amount to thereby maintain and control a high viscosity during the said kneading action thereby producing in the mass while being kneaded an internal attrition of pigment particles against pigment particles causing by such attrition alone the breaking down of the agglomerates and/or flocculates and dispersing the finely divided pigment throughout the film-forming vehicle, and subsequently introducing and working into the mass the remaining predetermined amount of solvent necessary to complete the dissolution of the nitrocellulose to change it into a continuous viscous phase.

2. An improved method for preparing a dispersion of pigment in a soluble cellulosic dispersion medium which consists in the new step of subjecting a non-aqueous mix of undissolved soluble cellulose and pigment to the kneading action of a mixing machine in the presence of a relatively small quantity of a solvent to initiate the chemical action of dissolving the soluble cellulose simultaneously with the dispersion of the pigment throughout the batch, the said quantity of solvent being insufficient to complete the dissolution of the soluble cellulose but of an amount to maintain and control a high viscosity in the mass during the kneading action, thereby producing in the mass while being kneaded, an internal attrition of pigment particles causing by such attrition and kneading the breaking down of the pigment agglomerates and dispersing the finely divided pigment throughout the kneaded mass, and subsequently introducing and working into the mass the remaining predetermined amount of solvent necessary to complete the dissolution of the soluble cellulose and to maintain it in its continuous viscous phase.

3. An improved method for preparing a dispersion of pigment in a soluble cellulosic dispersion medium which consists in the new step of subjecting a non-aqueous mix of undissolved soluble cellulose and pigment to the kneading action of a mixing machine in the presence of a quantity of a liquid solvent sufficient to initiate the chemical action of dissolving the soluble cellulose simultaneously with the dispersion of the pigment throughout the batch and regulating the amount of solvent to prevent reduction of the viscosity of the mass to a point destructive of the maintenance of the dispersion of the pigment particles and to maintain and control a high viscosity in the mass during the kneading action, thereby producing in the mass while being kneaded an internal attrition on the pigment particles causing by such attrition and kneading the breaking down of the pigment agglomerates and dispersing the finely divided pigment throughout the kneaded mass, subsequently introducing and working into the mass the remaining predetermined amount of solvent necessary to complete the dissolution of the soluble cellulose and to maintain it in its continuous viscous phase.

EMILE DE STUBNER.